June 19, 1928.
J. ALLINGHAM
1,674,030
PROCESS FOR MAKING ZINC
Filed April 30, 1923
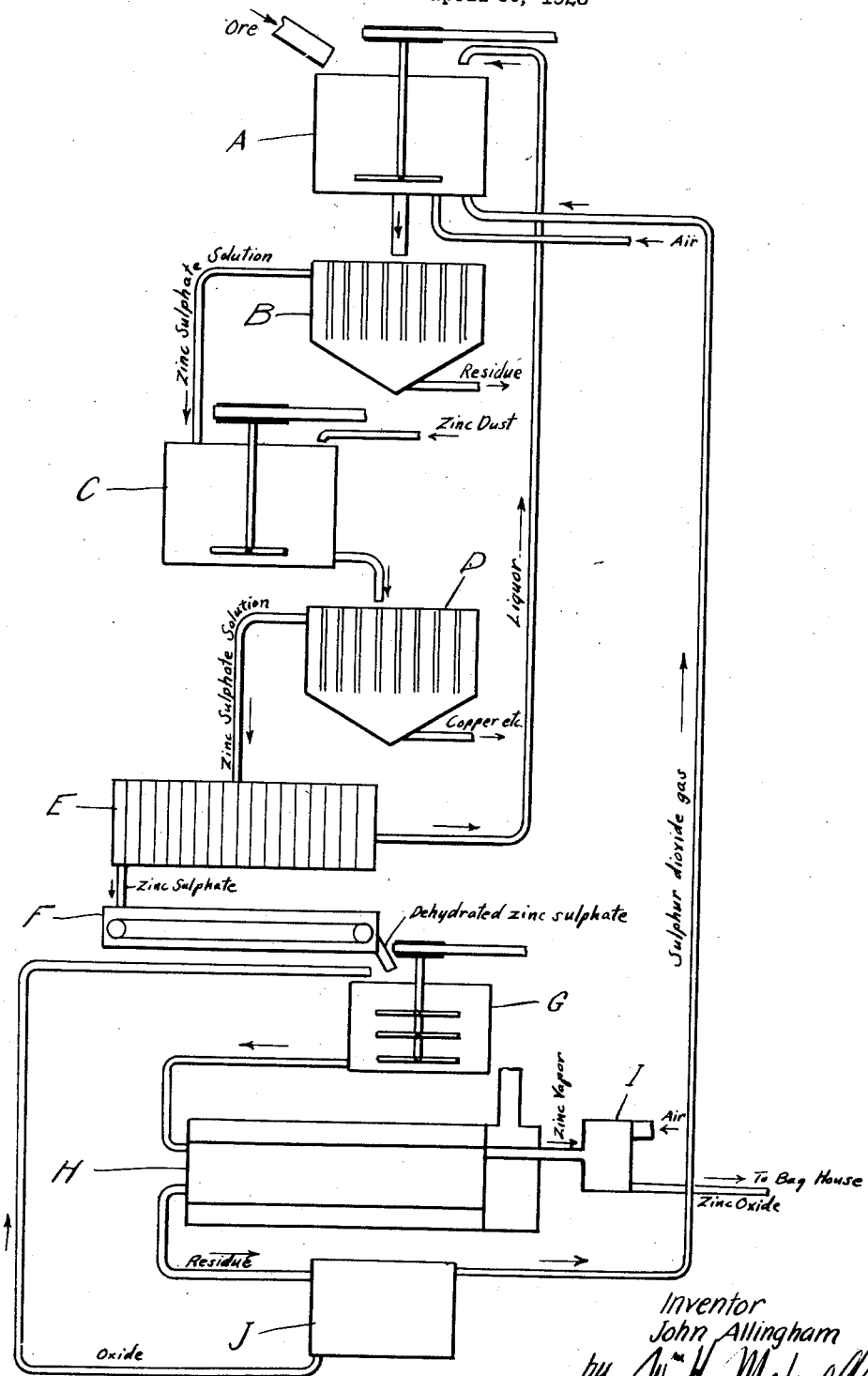
Inventor
John Allingham
by W. H. Maxwell
his Attorney Patented June 19, 1928.

1,674,030

UNITED STATES PATENT OFFICE.

JOHN ALLINGHAM, OF LOS ANGELES, CALIFORNIA.

PROCESS FOR MAKING ZINC.

Application filed April 30, 1923. Serial No. 635,510.

This invention relates to a process for making zinc or zinc oxide from oxidized or sulphide ores, or from zinc sulphate, it being an object of the invention to provide a method of producing zinc oxide having desirable physical characteristics.

Zinc oxide can be produced from oxidized or sulphide ores, or from zinc sulphate, by various methods. However, the zinc oxides produced by the usual methods do not have desirable physical characteristics. This is mainly because during the carrying out of the processes there are certain elements or conditions present that have an influence upon the physical characteristics of the zinc oxide produced. For example, with ordinary methods there are produced, or are present, gases, such as sulphur dioxide and carbon monoxide, that have a marked influence on the zinc oxide, and have a tendency to make it particularly crystalline, so that it is unsuited for many uses.

It is an object of this invention to provide a process for producing zinc oxide without subjecting it to elements or conditions which give it undesirable physical characteristics.

Another object of this invention is to provide a process for producing zinc oxide from zinc sulphate or zinc sulphide which causes liberation of the zinc and taking up of the sulphur so that the zinc is obtained substantially free of sulphur and has not been materially influenced by sulphur or sulphur gases.

The objects and features of my invention will be best and more fully understood from the following detailed description of a typical preferred application and carrying out thereof, throughout which description reference is had to the accompanying drawing, in which the figure represents diagrammatically the several units of apparatus that will be hereinafter referred to.

In accordance with the broader aspects of this invention I may start the carrying out of the process with zinc sulphate, for instance, the ordinary zinc sulphate of commerce, or with zinc sulphide. However, I will herein describe a method of producing the zinc sulphate from ore, as it is usual to obtain it this way, and as my invention provides certain novel features in this procedure. It is to be distinctly understood, however, that the following reference to the manner of obtaining zinc sulphate from ore does not influence the broader aspects of the process of the present invention.

The ore from which the zinc sulphate is to be obtained is divided or ground so that the zinc will separate or dissolve out in the most advantageous manner. If the ore is a sulphide ore it is roasted in any ordinary manner before it is ground so that the maximum amount of zinc sulphate is formed. The ground ore is treated with sulphur dioxide gas and air in the presence of water to convert into zinc sulphate any zinc that may be present in the ore not in the form of zinc sulphate. This treatment takes place in an agitator indicated at "A," in the drawings, in which the ore is carried in water and the sulphur dioxide gas and air are passed through the water. During this treatment the pulp, that is, the mixture of water and ore, is agitated and is preferably warmed to aid the dissolving of the zinc into zinc sulphate.

Although I prefer to dissolve the zinc from the ore in the manner just described, I may obtain it by treatment with sulphuric acid in the well known manner or by any suitable method or combination of methods; for instance, I might use a method employing both sulphur dioxide gas and sulphuric acid.

The zinc sulphate solution is recovered by filtering and washing with water, in accordance with the ordinary practice. This treatment may be carried out in a suitable filter "B." Any objectionable metals that may be present in the zinc sulphate solution thus obtained may be thrown out or removed by suitably treating the solution. For instance, if the solution contains metals such as lead, copper and cadmium, it may be cleared by treatment with zinc dust. The zinc dust may be applied to the zinc sulphate solution in a suitable agitator "C" and the precipitated metals separated out of the solution in a suitable filter "D."

The zinc sulphate solution, after being cleared in the filter "D", is treated in an evaporator "E" to obtain zinc sulphate crystals, or, in other words, so that the zinc crystallizes out of the liquor. The liquor left after the zinc sulphate has been crystallized out is preferably returned to the agitator "A" to serve as the liquid or water to form the pulp above described. The crystalline zinc sulphate obtained from the avaporator "E" may be passed directly to the apparatus for carrying out the distinctive part of my process, although it is preferred to dehydrate it first in a suitable dehydrater "F".

In accordance with the broader aspects of my invention, the zinc sulphate is treated so that it is reduced in the presence of an element or under such conditions that the sulphur is immediately taken up or combined, leaving the zinc free. Further, the zinc upon separating from the sulphur, allowing the sulphur to unite so that it does not further influence the zinc, may be oxidized into the desired zinc oxide. If it is desired to obtain zinc and not zinc oxide the zinc is, of course, not oxidized. The invention may be carried out with various elements, and, I may cite, for example, iron oxide, calcium oxide, or calcium carbonate, and carbon or any other reducing agent for the zinc sulphate.

When the process is carried out with an iron oxide and carbon the materials are mixed in the mixer "G" from which they pass into a closed muffle or chamber in the form of a furnace "H". The furnace is heated to about 1000 degrees centigrade, causing the following general reaction to take place.

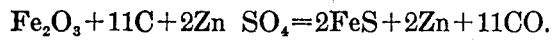
$Fe_2O_3 + 11C + 2Zn\ SO_4 = 2FeS + 2Zn + 11CO$.

In this reaction the iron oxide is reduced to iron and the zinc sulphate is reduced to zinc sulphide; the sulphur of the zinc sulphide having more affinity for iron immediately goes over to the iron to form iron sulphide leaving the zinc free as zinc vapor. The zinc vapor passes off to a combustion chamber "I" where air is introduced to burn it to zinc oxide. I have found that satisfactory results can be had using the following materials in about the proportions given:

50 parts iron oxide (for instance as hematite $Fe_2O_3$).
30 parts carbon (for instance, coke).
150 parts zinc sulphate in anhydrous form.

When calcium oxide and carbon are used the materials are mixed in the mixer "G" from which they pass into the furnace "H" which is heated to about 1000 degrees centigrade. The following general reaction takes place:

$CaO + 5C + Zn\ SO_4 = Ca\ S + 5CO + Zn$.

During this reaction, and as a result of this reaction, the sulphur liberated by the breaking down of the zinc sulphate is immediately taken up by the calcium of the calcium oxide to form calcium sulphide, whereas, the zinc is liberated and passes off as zinc vapor substantially free of sulphur and without having been subjected to the influence of sulphur, for instance, as sulphur dioxide, so that its physical characteristics are impaired. The zinc passes to a combustion chamber "I" where it contacts with air and is burned to zinc oxide. During the general reaction given above intermediate reactions may take place which do not necessarily concern us, for instance, when the zinc sulphate is broken down the zinc is liberated as zinc sulphide and the lime present reacts with the zinc sulphide to form calcium sulphide and zinc oxide which latter is immediately reduced to zinc vapor. In the case just described satisfactory results can be had with the following materials in about the proportions named:

40 parts burnt lime (calcium oxide).
30 parts carbon (coke).
150 parts zinc sulphate (anhydrous form).

It will be obvious that the process can be carried out by starting with zinc sulphide instead of zinc sulphate and the reactions will be substantially as I have given above. When I start with zinc sulphide I can use metallic iron, for instance, iron sponge, and eliminate carbon, or the reducing agent. The interchange of sulphur between zinc sulphide and iron will take place without a reducing agent.

The residue left in the furnace "H" is removed to a suitable burner "J" whereby the application of heat, etc., in accordance with established practice, that is, by the Claus process, sulphur dioxide gas is produced. This gas is, in accordance with my invention, conducted to the agitator "A" where it is used in dissolving the pulp, as I have before described. The oxide left after the production of the sulphur dioxide gas is returned to the mixer "G".

I wish it understood that I have specified certain materials and proportions merely as typical of those that may be used in carrying out my invention, and that I do not want my invention understood as limited to these particulars. In practice I employ calcium oxide as this material may be obtained and is comparatively inexpensive, however, in accordance with the broader aspects of my invention, I may use any material which will, under the conditions of my process, take up or hold the sulphur when it is liberated from the zinc so that it does not interfere with the zinc oxide. The carbon is present as a reducing agent and may be replaced by any substance that will effect the reduction above described. The carbon, in the cases given above, prevents the formation of sulphur dioxide gas and acts as a reducing agent for the zinc sulphate and, in the case of an iron oxide, it acts as a reducing agent for the iron oxide. The carbon may be used in any ordinary form, for instance, it may be graphite, lampblack, coal dust, coke, gas carbon, etc. In practice sufficient carbon is used so that a maximum of carbon dioxide and a minimum of carbon monoxide are produced.

Having described only a typical preferred form of my invention I do not wish to limit myself to the specific details hereinabove set forth, but wish to reserve to myself any changes or variations that may appear to those skilled in the art or fall within the scope of the following claims.

Having described my invention, I claim:

1. The hereindescribed process of treating zinc sulphide ore including, roasting the ore, dissolving the zinc out of the ore as zinc sulphate by treating a pulp of the ore with sulphur dioxide gas, separating the zinc sulphate out of solution, reducing the zinc sulphate to zinc and a compound of sulphur, treating the compound of sulphur to generate sulphur dioxide gas, and returning the sulphur dioxide gas to dissolve the zinc out of pulp.

2. The hereindescribed continuous process of treating zinc sulphide ore including, roasting the ore, dissolving the zinc as zinc sulphate by treating a pulp of the ore with sulphur dioxide gas, separating the zinc sulphate out of solution, returning the liquor left from the separation to ore to form pulp, reducing the zinc sulphate to zinc and a compound of sulphur, reducing the compound of sulphur to generate sulphur dioxide gas, and returning the sulphur dioxide gas to dissolve zinc out of pulp.

3. The hereindescribed process of making zinc oxide from sulphide ore including, roasting the ore, dissolving the zinc out of the ore as zinc sulphate by treating a pulp of the ore with sulphur dioxide gas, separating the zinc sulphate out of solution, reducing the zinc sulphate to zinc and a compound of sulphur, with an oxide that combines with the sulphur, treating the compound of sulphur to generate sulphur dioxide gas and an oxide, returning the oxide to the treatment of the zinc sulphate, and returning the sulphur dioxide gas to dissolve zinc out of pulp.

4. The hereindescribed process of making zinc from sulphide ore including, roasting the ore, dissolving the zinc out of the ore as zinc sulphate by treating a pulp of the ore with sulphur dioxide gas, separating the zinc sulphate out of solution, heating the zinc sulphate in the presence of a reducing agent and iron, removing the zinc, treating the compound of sulphur formed to generate sulphur dioxide gas and an oxide, returning the oxide to the treatment of the zinc sulphate, and returning the sulphur dioxide gas to dissolve zinc out of pulp.

In witness that I claim the foregoing I have hereunto subscribed my name this 19th day of April 1923.

JOHN ALLINGHAM.